United States Patent Office 3,793,304
Patented Feb. 19, 1974

3,793,304
CYCLIC DECAPEPTIDES COMPRISING AN
L-TYROSINE RADICAL
Theodor Wieland, Heidelberg, Christian Rietzel, Eschelbronn, and Christian Birr, St. Ilgen, Germany, assignors to Boehringer Ingelheim GmbH, Ingelheim am Rhein, Germany
No Drawing. Filed June 9, 1972, Ser. No. 261,256
Claims priority, application Germany, June 18, 1971, P 21 30 410.9
Int. Cl. C07c 103/52; C07g 7/00
U.S. Cl. 260—112.5
5 Claims

ABSTRACT OF THE DISCLOSURE

Cyclic decapeptides of the formula

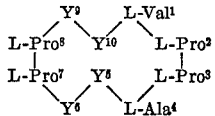

wherein one Y is L-tyrosine and the others L-phenylalanine, and their condensation products with oxygen-containing inorganic acids or with organic acids; the compounds are useful as anti-toxins against phalloidin.

---

This invention relates to novel cyclic decapeptides comprising an L-tyrosine radical and their condensation reaction products with oxygen-containing inorganic acids or with organic acids, as well as to processes for the preparation of these compounds.

BACKGROUND OF THE INVENTION

It is known that antamanid, i.e. the cyclic decapeptide of the formula

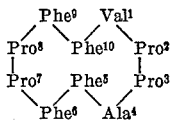

which occurs in small amounts as a constituent component of the poisonous green fungus *Amanita phalloides*, is capable at very low dosage of counteracting the effects of an absolutely fatal dose of phalloidin or of completely protecting the liver against such a fatal dose of phalloidin [see Theodor Wieland et al., Angewandte Chemie, 80, 209 (1968)]. However, antamanid has the practical disadvantage that it is virtually insoluble in water, which means that it can be subcutaneously or intravenously administered only in conjunction with relatively large volumes of an organic, watermiscible solvent, such as dimethylsulfoxide, whereby its practical application is seriously curtailed.

OBJECTS OF THE INVENTION

It is an object of the present invention to provide novel cyclic decapeptides.

Another object of the instant invention is to provide cyclic decapeptides comprising an L-tyrosine radical.

A further object of the invention is to provide freely water-soluble cyclic decapeptides with anti-toxic activity against fatal doses of phalloidin.

Still other objects and advantages of the present invention will become apparent as the description thereof proceeds.

THE INVENTION

We have discovered that the above objects are achieved and the disadvantages of antamanid overcome by replacing one of the phenylalanine radicals in the antamanid molecule by an L-tyrosine radical. The resulting cyclic decapeptides are freely soluble in weakly alkaline water and exhibit an anti-toxic activity against absolutely fatal doses of phalloidin which is undiminished over that of antamanid.

On the other hand, we have found that if two or more of the phenylalanine radicals in the antamanid molecule are replaced by L-tyrosine, the anti-toxin or protective activity against phalloidin diminishes.

The water-solubility of the L-tyrosine-containing cyclic decapeptides of the present invention may be further enhanced by condensing the phenolic OH-group of the L-tyrosine radical with a suitable acid radical; this variation leads to phalloidin anti-toxins which are freely soluble in water, even in neutral solution. Examples of suitable such radicals are especially those which contain an acid grouping, such as radicals of oxygen-containing inorganic acids, especially monoesters of polybasic acids such as sulfuric acid or phosphoric acid, or radicals of organic acids such as a carboxylic acid or a sulfonic acid, especially the carboxymethyl or 3-sulfopropyl radical.

Thus, the present invention more particularly relates to cyclic decapeptides of the formula

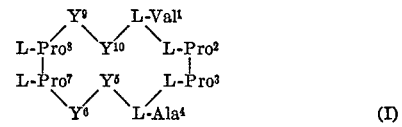 (I)

wherein one Y is L-tyrosine and the others are L-phenylalanine, and their condensation products with an oxygen-containing inorganic acid or with an organic acid.

The cyclic decapeptides embraced by Formula I are prepared by cyclizing the corresponding acyclic decapeptide.

The cyclization is performed according to conventional methods in peptide synthesis and may take place at any desired place in an acyclic precursor of the cyclic decapeptide between an amino group and a carboxyl group. In the case of the aminoacid proline, the imino group (HN=) may be present at the end of the chain instead of an amino group (H₂N—).

Two processes are mainly involved, both of which, however, are suitable for general application.

In the first process, one end of the chain, preferably the carboxyl group, is applied in an activated form, while the amino group has already been reversibly protected by the previous synthesis, or, if this is not the case, must be protected. The amino protective group is then selectively split off in such a way that the amino group thus liberated is protected simultaneously by protonation. Deprotonation of the amino group by bases in highly dilute solution leads to cyclization.

According to a second process, one starts with a peptide zwitterion, the amino group of which is already present in protonated condition. By activation of the carboxyl group and addition of a base in dulute solution, or by addition of a dehydrating agent to the peptide zwitterion, the cyclic end product is also obtained in one step.

All of the cyclization methods are performed in relatively great dilutions in order to suppress di- and polycondensations.

A variation, in which the danger of polymerization is avoided, consists of suitably protecting the nitrogen of the peptide to be cyclized, activating the latter with its carboxyl group by contact with a synthetic resin, splitting off the protective amino group, and effecting the cyclization by adding a base. By adsorption of each individual molecule on the resin a reciprocal reaction is made impossible.

The following have proved to be well suited as carboxyl-activating groups for the first-mentioned process: lower esters, azides, p-nitrophenyl, thiophenyl, o-cyanomethyl or p-methylsulphonylphenyl. The activation by imidazolide formation [cf. L. A. Albertson, Organic Reactions, vol. 12, pp. 157–355 (1962)] should also be mentioned.

Certain activation reagents possess the property of removing a proton from —NH$_3^+$ during the activation process at the carboxyl group. Synchronous with the activation, the amino group is thereby liberated which reacts with the activated carboxyl group leading to cyclization. Examples of these reagents are carbodiimides, such as dicyclohexylcarbodiimide, alkoxyacetlyene, di-(2,4-dinitrophenyl)-carbonate, other carbonic acid esters, as well as dialkylpyrophosphites. They are preferably used for reactions according to the second process indicated above.

Suitable amino-protective groups are those which may be selectively split off without affecting the activated carboxyl group for example, tert.-butyloxycarbonyl, benzyloxycarbonyl, p-nitrobenzyloxycarbonyl, trityl, phthaloyl, formyl, trifluoroacetyl, tosyl, cyclo-pentyloxycarbonyl or phenoxycarbonyl radicals.

Organic bases, such as triethylamine, pyridine, N-methylmorpholine, dimethylaniline, N-ethylpiperidine, etc., are preferably used for the cyclizing reaction with bases.

The production of the starting materials, i.e. of the acyclic decapeptides which may be cyclized to the decapeptides according to the invention, may be effected pursuant to all conventional methods of peptide synthesis, or by synthesis on solid-phase polystyrene according to Merrifield.

The syntheses of the tyrosine-containing peptides according to the invention are achieved under the blocking protection of tyrosin-hydroxyl by the benzyl group.

In the conventional synthesis, f.i. of the $^6$tyro-antamanid, the splitting of the benzyl group after cyclization is effected by treatment with hydrogen bromide in trifluoroacetic acid. In the synthesis of the tyrosine-containing peptides on solid-phase styrene according to Merrifield, analogous to Th. Wieland, Chr. Birr and F. Flor, Liebigs Ann. Chem., 727, 130 (1969), the benzyl group is split off from the oxygen of the O-benzyl-tyrosine simultaneously with the splitting of the linear decapeptide from the polystyrene resin with hydrogen bromide in trifluoroacetic acid, so that the subsequent cyclization leads directly to the desired end product.

The following is a schematic representation of the production of the decapeptides (1) (O-benzyl)-tyr-pro-pro-phe-phe-val-pro-pro-ala-phe (III) and (2) phe-pro-pro-phe-phe-val-pro-pro-ala-tyr (IV).

Decapeptide III is constructed from individual peptides in the conventional way, while decapeptide IV is constructed on a solid phase analogous to Th. Wieland, Chr. Birr and F. Flor, Leibigs Ann. Chem., 727, 130 (1969). All of the aminoacids belong to the L-series.

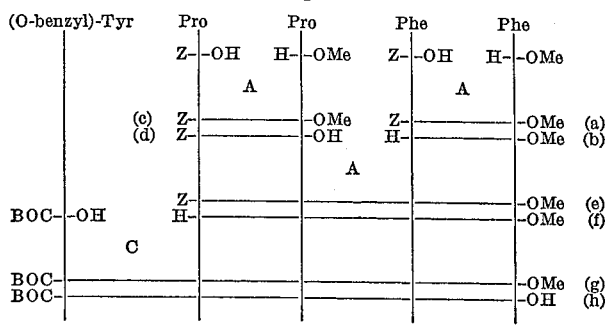

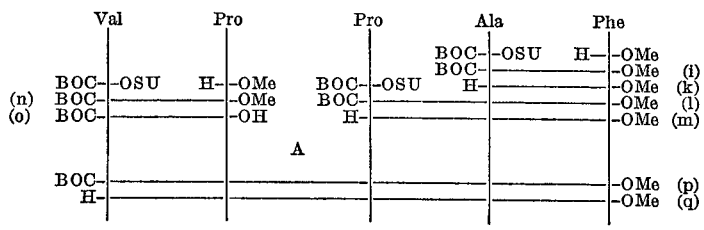

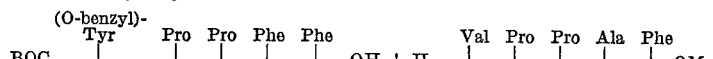

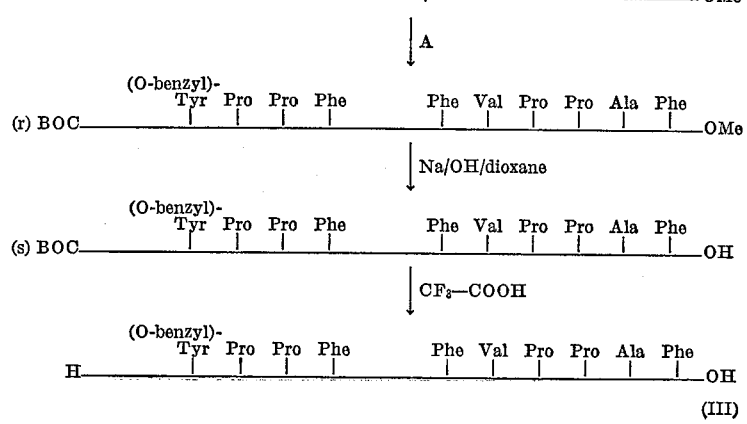

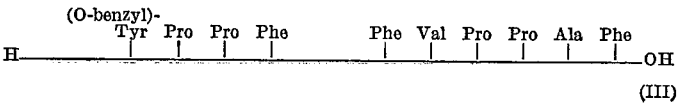

The following examples further illustrate the present invention and will enable others skilled in the art to understand it more completely. It should be understood, however, that the invention is not limited solely to the particular examples given below.

EXAMPLE 1

(a) Cyclization of decapeptide III into $^6$(O-benzyl)-tyrosylantamanid 300 mg. of decapeptide III were dissolved in dimethylformamide, and methylene chloride was added. To this solution 110 mg. of N-hydroxysuccinimide and the calculated quantity of a 1% solution of N-methyl-morpholine in methylene chloride (to pH 4–5) were added. The mixture was cooled to 0° C. and admixed with a solution of 105 mg. of dicyclohexylcarbodiimide in 5 ml. of methylene chloride, and the reaction mixture was allowed to stand for five hours at 0° C. Subsequently, it was stirred for two days at room temperature. Thereafter, it was evaporated in vacuo, the residue was taken up in tetrahydrofuran, and the undissolved dicyclohexylurea was filtered off.

In order to separate uncyclized linear peptide, which is adsorbed on $Al_2O_3$, the filtrate was chromatographed on basic $Al_2O_3$ in tetrahydrofuran. The eluate was evaporated and chromatographed once more on silicagel (0.05 to 0.2 mm.) in chloroform, whereby the cyclopeptide was adsorbed. After exhaustive elution of the dicyclohexylurea with chloroform, the column was treated with tetrahydrofuran in order to dissolve the adsorbed cyclopeptide. The fractions were combined and evaporated, the residue was dissolved in a little acetone, the solution was centrifuged until clear and then admixed at 40° C. with several drops of water until it became turbid. After scratching with a glass rod, the cyclopeptide crystallized out overnight.

Yield: 102.5 mgm. (36% of theory).
M.P.: 158–160° C. (sintering at 150° C.).
DC (sec. butanol-glacial acetic acid-water=14:12:5): uniform.

(b) $^6$Tyr-antamanid 25 mg. of $^6$(O-benzyl)-tyr-antamid were dissolved in several ml. of trifluoroacetic acid. A slow stream of HBr was passed through this solution for two hours at room temperature; the hydrogen bromide had previously been passed through a 10% solution of resorcinol in trifluoroacetic acid and a $CaCl_2$-cylinder for purification and drying. After evaporation in vacuo, the residual trifluoroacetic acid was eliminated as far as possible by repeatedly pouring absolute ether over the residue and evaporating in vacuo again. Finally, the residue was dried over potassium hydroxide.

Yield: 19.0 mg. of amorphous substance (88% of theory). The amorphous cleavage product was dissolved in a little acetone, and the solution was warmed and admixed with several drops of water until turbidity set in. Crystallization took place overnight.

Yield: 17.0 mg. (79% of theory).
M.P. 170–178° C.

EXAMPLE 2

$^6$(O-carboxymethyl)-tyr-antamanid

In a pointed centrifuge tube 200 mg. of $^6$tyr-antamanid were dissolved in 0.5 ml. of dry dimethylformamide, and the solution was thoroughly admixed with 0.5 ml. of ethyl iodoacetate and 200 mg. of silver oxide. The mixture was allowed to stand for twelve hours at room temperature, interrupted by occasional shaking. After dilution with 5 ml. of methanol, the silver oxide and silver iodide were centrifuged off and washed three times with each 5 ml. of methanol. After evaporation in vacuo, the dry residue was taken up in several ml. of methanol, the solution was admixed with 0.3 ml. of 1 N aqueous sodium hydroxide, and the mixture was stirred for three hours at room temperature. Then it was adjusted with 0.1 N sulfuric acid to pH 2, the methanol was evaporated in vacuo, the residue was dissolved in 20 ml. of water, and the solution was extracted several times with 10 ml. of chloroform. After evaporation, 193 mg. of an oil remained behind, which was taken up in 5 ml. of 2 N ammonium hydroxide, and the solution was evaporated in vacuo. The residue, admixed with a little methanol, was spread on thin-layer chromatography plates (silicagel 2 mm. thick), and the ammonium salt, by developing it twice with butanone-acetone-water (60:6:10), was separated from the farther migrating starting material. The main fraction ($R_F$ 0.20) was eluated with methanol, and the evaporation residue was chromatographed in methanol on a column of Sephadex LH–20 (1 x 100 cm.). The evaporation residue of the main fraction was taken up in a little 2 N $NH_4OH$, the solution was evaporated again, and the residue was dissolved in a little methanol. Upon evaporation, 120 mgm. (56% of theory) of the ammonium salt $^6$(O-carboxymethyl)-tyr-antamanid crystallized out as platelets having a melting range of 215–235° C.

EXAMPLE 3

Sodium $^6$tyr-antamanid-O-propane-3-sulfonate 116 mgm. of $^6$tyr-antamanid were dissolved in 2 ml. of a solution of 0.1 N sodium methylate in methanol, and the solution was refluxed under exclusion of moisture with 30 mgm. of 1,3-propanesultone. After two hours, 0.1 ml. of a 1 N sodium methylate solution in methanol and ten minutes later 24 mgm. of 1,3-propanesultone were added, and these additions were repeated after heating for another two hours.

Two hours after the last addition, almost no reacted $^6$tyr-antamanid could be detected by thin-layer chromatography. Then, the reaction solution was evaporated to dryness in vacuo, and the residue was dissolved in 1 ml. of methanol and purified by thin-layer chromatography on silicagel with sec.butanol-ethylacetate-water (14:12:5) as the flow agent. The methanolic eluate of the main fraction ($R_F$ 0.24) was chromatographed for separation of dissolved silicagel, as described in Example 2.

By precipitation from methanol with ether, 78 mgm. (60% of theory) of the colorless, amorphous, freely water-soluble sodium salt of $^6$tyr-antamanid-O-propane-3-sulfonate having a melting range of 228–240° C. were obtained.

Analysis.—Calculated for $C_{67}H_{83}N_{10}O_{14}SNa$ (percent): C, 61.55; H, 6.40; N, 10.71; S, 2.45. Found (percent): C, 61.70; H, 7.15; N, 11.06; S, 2.59.

EXAMPLE 4

Sodium $^6$tyr-antamanid-sulfate 310 mgm. of dicyclohexylcarbodiimide were dissolved in 0.2 ml. of dry dimethylformamide and, while cooling the solution with ice, 140 mgm. of $^6$tyr-antamanid and 0.15 ml. of dimethylformamide were added. While continuing to cool with ice, the clear solution was admixed with 0.15 ml. of a solution of 0.33 ml. of concentrated (96%) sulfuric acid in 3.75 ml. of ice-cooled dimethylformamide, and the mixture was shaken. After 30 minutes of standing, the slurry was diluted wtih 25 ml. of dimethylformamide and neutralized, while cooling with ice, with 0.4 ml. of 1 N NaOH. Now, the dicyclohexylurea was filtered off, and the filtrate was evaporated to dryness in an oil pump vacuum at 30° C. The residue was dissolved in 10 ml. of methanol, the solution was admixed with 5 ml. of water, the dicyclohexylurea was filtered off, and the filtrate was passed through a column (1 x 10 cm.) of Sephadex DEAE A25 (chloride form). After washing with 500 ml. of methanol-water (2:1), sodium $^6$tyr-antamanid-sulfate was eluated with 0.5 ml. of NaCl in the same mixture. The dry evaporation residue of the eluate was extrated with absolute ethanol, the filtrate was evaporated in vacuo, the residue was taken up in several ml. of methanol, and the solution was chromatographed on a column of Sephadex LH–20 (1 x 100 cm.) in methanol. The main fraction was evaporated in vacuo, and the oily residue was dissolved in 2 ml. of methanol. After some time the sodium salt of 6tyr-antamanid-sulfate crystallized out. 105 mgm. (70% of theory) of the product having a melting range from 210–230° C. were obtained.

Analysis.—Calculated for $C_{64}H_{77}N_{10}O_{14}SNa$ (percent): C, 60.76; H, 6.13; N, 11.07; S, 2.53. Found (percent): C, 60.63; H, 6.49; N, 10.93; S, 2.63.

EXAMPLE 5

6Tyr-antamanid phosphate 470 mgm. of 6tyr-antamanid were dissolved in 5 ml. of dry pyridine, and the solution was admixed with 1 ml. of a mixture of 0.7 ml. of phosphorus oxychloride and 10 ml. of dry pyridine at 0° C., while stirring. The resulting mixture was kept for five minutes at this temperature, and was then stirred for six hours at 20° C. Thereafter, the reaction mixture was admixed with 200 ml. of water, the aqueous mixture was evaporated in vacuo at 30° C., the residue was taken up in 200 ml. of methylene chloride, and the solution was extracted with NaCl-saturated 0.1 N sodium hydroxide. The alkaline phase was acidified with 2 N sulfuric acid to pH 1.5 and extracted with a total of 1 liter of methylene chloride. The organic extract solution was evaporated in vacuo at 30° C., rapidly dried and weighed. Yield of 6tyr-antamanid phosphoric acid ester: 249 mgm. (48% of theory). Melting range from 205–220° C.

EXAMPLE 6

(a) L - phenylalanyl-L-prolyl-L-prolyl-L-phenyl-alanyl-L-phenylalanyl - L - valyl - L - profyl-L-prolyl-L-alanyl-L-tyrosine (IV) on solid phase The synthesis was carried out according to the principle of Merrifield [R. B. Merrifield, Advances in Enzymol. 32, 221 (1969)] by means of linkage of BOC-amino acids with cyclohexylcarbodiimide with the terminal carboxyl-substituted amino acid which was esterified with chloromethylpolystyrene resin (2% cross-linking with divinyl-benzene). 10 gm. of the resin were esterified with BOC-(O-benzyl)-tyrosine to a ratio of 0.96 millimol per gm. of resin. Then, the BOC-group was split off by treatment with 1 N HCl in glacial acetic acid, the amino group was deprotonated, after washing with $CH_2Cl_2$, by treatment with 10% triethylamine solution in $CH_2Cl_2$ and the next BOC-protected amino acid (BOC-L-alanine) was coupled in triple excess with the aid of dicyclohexylcarbodiimide (three hours, 20° C.). This step was followed by removal of the BOC-group and further lengthening of the peptide chain, analogous to the described sequence of operations. After linkage of the 10th amino acid (BOC-L-phenylalanine) to the chain, 15.7 gm. of resin loaded with decapeptide resulted, from which, after treatment with HBr in suspension in trifluoroacetic acid (treated in 100 ml.-portions for 90 minutes with gaseous HBr) and precipitation from the solution with 2 liters of absolute ether, 6.2 gm. of decaptide IV free of BOC and benzyl (as hydrobromide) were recovered.

Yield: 56% of theory.

(b) 5Tyr-antamanid

Cyclization of IV as described for III. Yield from 3 gm. of the linear peptide: 975 mgm.=33% of theory of crystallized product, M.P. 174–180° C.

EXAMPLE 7

5(O-carboxymethyl)-tyr-antamanid

The compound was prepared analogous to Example 2, but purified as its ammonium salt by chromatography in 0.02 N ammonium hydroxide solution on Sephadex LH–20 (1 gm. on a column of 5 x 180 cm.), whereupon it appeared in the eluate between 1–1.2 liters. The melting point range was from 216–230° C.

EXAMPLE 8

Sodium 5tyr-antamanid-O-propane-3-sulfonate

The sodium salt of the isomeric derivative was prepared in the same way as described in Example 3. Instead of using chromatographic purification, the evaporation residue of the reaction mixture of 450 mgm. of 5tyr-antamanid was dissolved in 40 ml. of water, and the neutral solution was extracted with chloroform several times. The aqueous phase was adjusted with sulfuric acid to pH 1–2 and extracted several times with chloroform and ethylacetate (1:1), the aqueous solution being saturated at the end with common salt. After drying and evaporating of the organic phases, 200 mgm. of residue were obtained which, after neutralization with NaOH and evaporation, yielded the colorless amorphous sodium 5tyr-antamanid - O - propane - 3 - sulfonate. The melting point range was between 225 and 240° C.

The starting compounds (s) and (t) were prepared by the following process.

PENTAPEPTIDE DERIVATIVE I (a) Benzyloxycarbonyl (hereinafter Z) L-phenylalanyl-L-phenylalanine methyl ester.—100 gm. of Z-L-phenyl-alanine were dissolved in 600 ml. of tetrahydrofuran with 46.5 ml. of triethylamine, while stirring. At −15° C. (ice-salt bath) the resulting solution was admixed dropwise with 31.1 ml. of ethyl chloroformate at a speed such that the internal temperature did not rise above −4° C. Stirring was continued for six minutes at −4° C., and then a solution of L-phenylalanine methyl ester (prepared from 72 gm. of the ester hydrochloride in 100 ml. of tetrahydrofuran, cautious addition of water until dissolution and addition of 56.5 ml. of triethylamine) was added in portions within one minute. Now, stirring was continued without cooling until room temperature was reached, and then the solvent was evaporated in vacuo until only a little water was left. After taking up the residue in five times its volume of ethyl acetate, the solution was washed three times with 100 ml. of 1 N HCl, three times with the same amount of water, and three times with the same amount of aqueous 5% $KHCO_3$ solution. After extraction with a little water, the solution was dried over anhydrous $MgSO_4$, filtered, and the solvent was evaporated in vacuo. The residue was reprecipitated from ethyl acetate/petroleum ether. 108 gm. (70% of theory) of crystalline product, M.P. 146–167° C., were obtained.

(b) L-phenylalanyl - L - phenylalanine methyl ester hydrochloride.—76 gm. of the Z-peptide-ester obtained according to (a) were hydrogenated in a mixture consisting of 30 ml. of 9.9 N methanolic hydrochloric acid, 450 ml. of absolute methanol and 250 ml. of absolute dioxane over about 10 gm. of palladized charcoal catalyst at 40–45° C. in a stream of hydrogen, accompanield by vibration, until the waste gas no longer contained any $CO_2$. After filtration, the reaction solution was evaporated in vacuo, leaving 58 gm. (57% of theory) of the dipeptide ester hydrochloride as a colorless powder.

(c) Z-L-prolyl-L-proline methyl ester.—This ester was obtained from 91 gm. of Z-L-proline and 57 gm. of L-proline methyl ester according to the mixed anhydride method, as described under (a).

Yield: 41 gm. (34% of theory), M.P. 78–79%.

(d) Z-L-prolyl-L-proline.—130 gm. of the ester obtained according to (c) were dissolved in 270 ml. of very pure dioxane, and the solution was admixed with 400 ml. of 1 N sodium hydroxide. While adding water dropwise, the solution was vibrated until the volume had tripled (about one hour). The dioxane and part of the water were evaporated in vacuo, and the residual aqueous solution of the sodium salt was extracted twice with a little ethyl acetate. Then, the Z-L-prolyl-L-proline was liberated from the aqueous phase with 1 N hydrochloric acid, taken up in a total of 300 ml. of ethyl acetate by shaking with several smaller portions and, after drying of the solution over MgSO$_4$, isolated by evaporation.

Yield: 114 gm. (91% of theory), M.P. 186–188° C.

(e) Z-L-prolyl-L-prolyl - L - phenylalanyl - L - phenylalanine methyl ester.—This ester was prepared from the mixed anhydride of 52 gm. of the Z-L-prolyl-L-proline (d) in 660 ml. of tetrahydrofuran-dimethylformamide (10:1), 21 ml. of triethylamine and 14.25 ml. of ethyl chloroformate, according to the process described under (a) with 54.4 gm. of the dipeptide ester hydrochloride (b) in the presence of 23 ml. of triethylamine in 100 ml. of tetrahyrofuran. Yield: 80 gm. (82% of theory) of white crystals (from ethyl acetate), M.P. 140–141° C.

(f) L - prolyl-L-prolyl-L-phenylalanyl-L-phenylalanine methyl ester was obtained by catalytic hydrogenation of 10 gm. of Z-tetrapeptide ester (e) over 1.5 gm. of palladized charcoal in 150 ml. of absolute methanol. After recrystallization from methanol, 6.4 gm. (81% of theory) of white needles, M.P. 148–150° C., remained.

(g) Tert.butyloxy carbonyl (hereinafter BOC)-L-(O-benzyl)-tyrosyl-L-prolyl - L - prolyl - L - phenylalanyl-L-phenylalanine methyl ester was obtained by reacting 3.7 gm. of BOC-L-(O-benzyl)-tyrosine and 5.2 gm. of the tetrapeptide ester described under (f) in 50 ml. of absolute tetrahydrofuran in the presence of 2.8 gm. of dicyclohexyl-carbodiimide, first for one hour at −20° C., then 20 hours at room temperature. After filtering off the formed dicyclohexylurea and working up of the filtrate as usual, 7.3 gm. of a white, foamy mass were obtained.

(h) BOC-L-(O-benzyl)-tyrosyl - L - prolyl-L-prolyl-L-phenylalanyl-L-phenylalanine (pentapeptide derivative I) was produced by alkaline hydrolysis (as in (d)) from 3.0 gm. of the BOC-pentapeptide ester (g) and working up with 5% citric acid solution instead of with hydrochloric acid. Yield: 2.7 gm. (88.5% of theory) of BOC-L-(O-benzyl)-tyrosyl-L-prolyl-L-prolyl-L-phenylalanyl-L-phenylalanine (amorphous, white product of uniform behavior during thin-layer chromatography).

PENTAPEPTIDE DERIVATIVE II (i) BOC-L-analyl-L-phenylalanine methyl ester.—21.6 gm. of L-phenyl-alanine methyl ester hyrdochloride were dissolved in 60 ml. of dimethylformamide, and a solution of 10.2 gm. of triethylamine in 150 ml. of absolute tetrahydrofuran was added thereto. The resulting solution, which had become turbid from the precipitated triethylamine salt, was added to a solution of 28.2 gm. of BOC-L-alanine hydroxysuccinimide ester [prepared according to G. W. Anderson, J. E. Zimmermann and F. M. Callahan, J. Amer. Chem. Soc., 86, 1839 (1964)] in 150 ml. of absolute tetrahydrofuran, while stirring. After 15 hours the precipitated triethylamine hydrochloride was separated by vacuum filtration, and the filtrate was evaporated in vacuo. After dissolving the residue in ethyl acetate, shaking the solution several times with water, then with staturated aqueous sodium bicarbonate solution and again with water, drying the organic phase over MgSO$_4$, and evaporating it in vacuo, 31.5 gm. of BOC-L-alanyl-L-phenylalanine methyl ester (90% of theory), M.P. 81–83° C., remained as a residue.

(k) L-alanyl-L-phenylalanine methyl ester.—30.8 gm. of the BOC-dipeptide ester obtained as described under (i) were dissolved in 790 ml. of glacial acetic acid which was 1 N in HCl. After 1.5 to 2 hours of standing, the solution was distilled in vacuo, and the residue was thoroughly mixed with absolute ether until everything crystallized. 24.2 gm. (96% of theory) of crystalline dipeptide ester hydrochloride, M.P. 150–152° C., were obtained.

(l) BOC-L-prolyl-L-alanyl - L - phenylalanine methyl ester.—10.5 gm. of the dipeptide hydrochloride obtained as described under (k) were dissolved in 35 ml. of dimethylformamide in the presence of a solution of 3.6 gm. of triethylamine in 100 ml. of absolute tetrahydrofuran. The resulting solution was added, as described under (i), to a solution of 11.45 gm. of BOC-L-proline hydroxysuccinimide ester in 50 ml. of absolute tetrahydrofuran, and after 15–20 hours of standing, the reaction mixture was worked up as indicated under (i). 14.75 gm. (90% of theory) of the BOC-tripeptide ester, M.P. 119–122° C., were obtained.

(m) L-prolyl-L-alanyl-L-phenylalanine methyl ester.—14.3 gm. of the BOC-tripeptide ester obtained as described under (l) were freed with glacial acetic acid-HCl of the BOC-group, as described under (k). 11.6 gm. (94% of theory) of the colorless, amorphous hyrochloride of the tripeptide ester, M.P. 67–78° C., were obtained.

(n) BOC-L-valyl-L-proline methyl ester.—A solution of 2.6 gm. of L-proline methyl ester in 20 ml. of absolute tetrahydrofuran was added to a solution of 6.3 gm. of BOC-L-valine hydroxysuccinimide ester in 40 ml. of absolute tetrahydrofuran. After 20 hours of standing, the reaction mixture was forwed up as described under (i). 5.7 gm. (87% of theory) of BOC-L-valyl-L-proline methyl ester were obtained (colorless, amorphous product).

(o) BOC - L - valyl - L - proline.—24 gm. of BOC-L-valyl-L-proline methyl ester were dissolved in 115 ml. of dioxane, the solution was admixed, while stirring, with 73 ml. of 1 N sodium hydroxide, and stirring was continued for 25 minutes at room temperature. The resulting mixture was then diluted with 200 ml. of ether, the aqueous phase was separated, extracted three times with ether, cooled to 0° C., covered with a layer of 100 cc. of ether, and at 0° C. admixed dropwise with the equivalent quantity of concentrated hydrochloric acid. The ether was separated, the aqueous phase was extracted five times with ether, and the combined ethereal solutions were dried over MgSO$_4$ and evaporated. The residue crystallized upon treatment with petroleum ether to yield 16.5 gm. (72% of theory) of BOC-L-valyl-L-proline, M.P. 141–144° C.

(p) BOC - L - valyl - L - prolyl - L - prolyl-L-alanyl-L-phenylalanine methyl ester.—Using the mixed anhydride method, as described under (a), 12.6 gm. of the BOC-dipeptide obtained as described under (o) were coupled with 7.7 gm. of the tripeptide methyl ester hydrochloride obtained as described under (m) to form the pentapeptide derivative, and the reaction mixture was worked up as described under (a). 9.85 gm. (77% of theory) of BOC - L - valyl - L - prolyl - L - prolyl-L-alanyl - L - phenylalanine methyl ester (colorless, foamy product), M.P. 54–57° C., were obtained. A slight impurity detectable by thin-layer chromatography may be separated by gel-filtration on Sephadex LH–20 in methanol-water (10:1).

(q) L - valyl - L - prolyl - L - prolyl - L - alanyl-L-phenylalanine methyl ester (peptide derivative II).—4.1 gm. of the BOC-derivative obtained as described under (p) were covered with 5 to 10 times its volume of anhydrous trifluoro acetic acid, and the mixture was shaken until it dissolved completely (evolution of gas). After two hours the trifluoroacetic acid was evaporated in vacuo as far as possible. After pouring absolute ether over the residue and evaporating the liquid once more, the peptide derivative II remained behind as its trifluoroacetate. In order to purify the latter, it was passed in methanol-water (10:1) through a column (40 x 1800 mm.) of Sephadex LH–20 and, after evaporation of the UV-absorbing main fraction, 4.0 gm. (96% of theory) of the trifluoroacetate of peptide derivative II were obtained.

DECAPEPTIDE III (r) BOC - decapeptide methyl ester.—266 mgm. of peptide derivative I(h) were stirred for one hour in 10 ml. of absolute tetrahydrofuran with 240 mgm. of peptide derivative II(q), 4.32 ml. of a 1% solution of triethylamine in tetrahydrofuran, 71 mgm. of N-hydroxysuccinimide in 10 ml. of tetrahydrofuran and 90 mgm. of dicyclohexylcarbodiimide in 5 ml. of absolute tetrahydrofuran at −20° C.; the reaction mixture was then allowed to stand for 20 hours at room temperature. After filtering off the dicyclohexylurea, evaporating of the solution, taking up the residue in ethylacetate, filtering off additional dicyclohexylurea, washing the filtrate first with 5% citric acid solution and then with 10% sodium-bicarbonate solution, and evaporating the washed solution, 730 mgm. of a foamy mass were obtained, which was purified by chromatography on Sephadex LH–20 in methanol, yielding 520 mgm. of chromatographically uniform product.

(s) BOC - L - (O - benzyl) - tryosyl - L - prolyl - L-prolyl - L - phenyl - alanyl - L - valyl - L - prolyl - L-prolyl - L - alanyl - L - phenylalanine.—4.5 gm. of the BOC-decapeptide methyl ester described under (r) were dissolved in 60 ml. of dimethylformamide, and the solution was allowed to stand with ten times the equivalent quantity of 1 N aqueous sodium hydroxide solution for one hour at room temperature. Then, the dimethylformamide was evaporated with much water in vacuo, and the BOC-decapeptide acid was liberated by acidification with 5% citric acid solution and taken up in ethylacetate. After drying the solution over MgSO$_4$, 4.0 gm. (84% of theory) of a colorless, amorphous, thin-layer chromatographically uniform powder was isolated.

(t) L - (O - benzyl) - tyrosyl - L - prolyl - L - prolyl-L - phenylalanyl -L - phenylalanyl - L - valyl - L - prolyl-L - prolyl - L - alanyl - L - phenylalanine (III).—4.21 gm. of the BOC-decapeptide (s) were freed of the BOC-group with 25 ml. of trifluoroacetic acid, as described under (q). The white trifluoroacetate remaining after evaporation in vacuo was dissolved in several ml. of methanol-water (10:1) in order to remove the trifluoroacetic acid, then admixed with 1.6 gm. of ammonium bicarbonate, and chromatographed on a Sephadex LH–20 column with a 0.2% solution of ammonium bicarbonate in methanol-water (10:1) as the flow agent. 3.5 gm. (82% of theory) of the amorphous, thin-layer chromatographically uniform decapeptide were obtained.

As indicated above, the compounds according to the present invention protect against absolutely fatal doses of phalloidin. More particularly, the prophylactic protective dose of the various L-tyrosine analogs of anatamanid against an absolutely fatal dose (5 mgm.) of phalloidin in white mice is as follows:

| | Mgm./kg. |
|---|---|
| $^5$Tyr-antamanid | 0.5 |
| $^5$(O-carboxymethyl)-tyr-antamanid | 1.0 |
| $^6$Tyr-antamanid | 0.5 |
| $^6$(O-carboxymethyl)tyr-antamanid | 0.5 |
| Sodium $^6$-tyr-antamanid-O-propane-3-sulfonate | 0.5 |
| Sodium 6-tyr-antamanid-sulfate | 0.5 |
| $^6$Tyr-antamanid-phosphate | 1.0 |
| $^9$Tyr-antamanid | 2.0 |
| $^{10}$Tyr-antamanid | 2.0 |
| Antamanid | 0.5–1.0 |

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like.

While the present invention has been illustrated with the aid of certain specific embodiments thereof, it will be readily apparent to others skilled in the art that the invention is not limited to the illustrative embodiments and that various changes and modifications may be made without departing from the spirit of the invention or the scope of the appended claims.

We claim:
1. A cyclic decapeptide of the formula

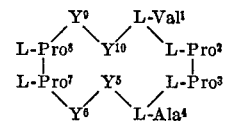

wherein one Y is L-tyrosyl and the others L-phenylalanyl, or a condensation product thereof with an oxygen-containing inorganic acid or with an organic acid.

2. A compound of claim 1, which is the cyclic decapeptide of the formula

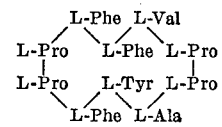

or a condensation product thereof with an oxygen-containing inorganic acid or with an organic acid.

3. A compound of claim 1, which is the cyclic decapeptide of the formula

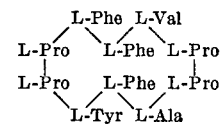

or a condensation product thereof with an oxygen-containing inorganic acid or with an organic acid.

4. A compound of claim 1, which is the cyclic decapeptide of the formula

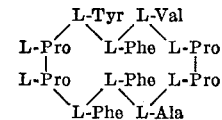

or a condensation product thereof with an oxygen-containing inorganic acid or with an organic acid.

5. A compound of claim 1, which is the cyclic decapeptide of the formula

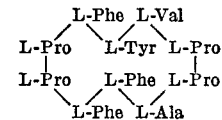

or a condensation product thereof with an oxygen-containing inorganic acid or with an organic acid.

References Cited

UNITED STATES PATENTS 3,705,887   12/1972   Wieland et al. ____ 260—112.5

OTHER REFERENCES

Wieland et al.: "Peptides 1968," E. Bricas, ed., North-Holland Publishing Co., Amsterdam (1968), pp. 243–6.

LEWIS GOTTS, Primary Examiner

R. J. SUYAT, Assistant Examiner

U.S. Cl. X.R.

424—177